Feb. 19, 1935.  P. LE B. SPENCER  1,992,047
THERMOSTATIC CONTROL
Filed Jan. 3, 1933   3 Sheets—Sheet 1

Percy Le Baron Spencer,
Inventor.
Delos G. Haynes,
Attorney

Feb. 19, 1935.  P. LE B. SPENCER  1,992,047
THERMOSTATIC CONTROL
Filed Jan. 3, 1933   3 Sheets-Sheet 2

Percy Le Baron Spencer,
Inventor

Feb. 19, 1935.  P. LE B. SPENCER  1,992,047
THERMOSTATIC CONTROL
Filed Jan. 3, 1933   3 Sheets-Sheet 3

Percy LeBaron Spencer,
Inventor,
Delos F. Haynes,
Attorney.

Patented Feb. 19, 1935

1,992,047

UNITED STATES PATENT OFFICE 1,992,047

THERMOSTATIC CONTROL

Percy Le Baron Spencer, West Newton, Mass., assignor to General Plate Company, Attleboro, Mass., a corporation of Massachusetts Application January 3, 1933, Serial No. 649,969

13 Claims. (Cl. 200—138)

This invention relates to thermostatic controls, and with regard to certain more specific features, to thermostatic controls of an instantaneous-acting character.

Among the several objects of the invention may be noted the provision of a thermostatic control of the character indicated which is susceptible to small temperature variations, responding thereto with reliable accuracy, and which has but a small temperature differential in operation; a thermostatic control particularly adapted for use as an electric switch; a thermostatic control having means permitting of accurate adjustment of the temperatures at which the device operates; and a thermostatic control of the class described which is relatively simple in construction and operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a plan view of a thermostatic control embodying the present invention;

Figure 11:
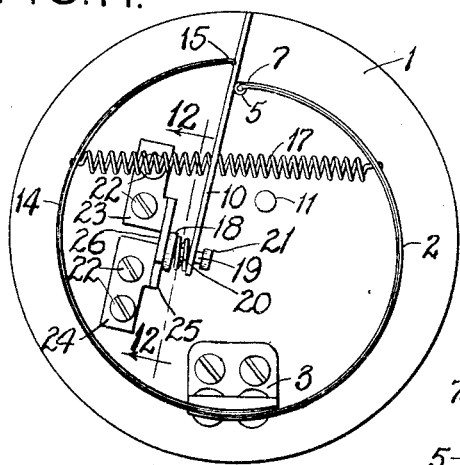
Fig. 11 is a plan view of an electric switch embodying the present invention.

Figs. 13, 14, 15, 16, 17, and 18 are views similar to Fig. 11, each showing a still further embodiment of the invention.

Similar reference characters indicate corresponding parts throughout the several views of the drawings.

The present invention falls into the class of thermostats which are snap-acting or instantaneous in their manner of change of position. It is, however, distinct both from thermostatic arrangements in which an extraneous over-centering toggle or the like is actuated by a slow-acting thermostat, and from thermostats which are of themselves snap-acting, such as the non-developable discs of John A. Spencer Patent 1,448,240. In the present invention, snap action is achieved by a reaction between a simple type of mounting, which includes a controlled element, and a thermostatic element, which is normally not snap-acting in itself.

Briefly, the present invention comprises a free-moving lever or controlled element, supported on a fulcrum, and an otherwise slow-acting, longitudinally resilient composite thermostatic strip fixed at one end and having its other end slidably engaging the lever in such manner that the position of the free end, relative to the fulcrum, shifts with thermal change from one to the other side of said fulcrum. This shifting of position, which is achieved only when the thermally engendered forces in the strip overcome the inherent longitudinal resilience of the strip, for reasons to be described hereinafter, changes the direction of the rotational force operating on the lever, and hence the lever rotates upon its fulcrum to a new position. As the shifting is thus determined by the opposition of two forces (one of which is varying with the temperature), such shifting takes place substantially instantaneously, and the motion of the lever has the desired snap-action characteristics.

In a preferred form of the invention, the fulcrum of the lever is itself the free end of a second otherwise slow-acting, longitudinally resilient composite thermostatic strip so positioned that the thermally-engendered forces therein are directed in an opposite sense to those of the first-mentioned thermostatic strip, whereby the forces contributing to the desired snap-action effect are multiplied.

The mechanisms through which the actions described above are obtained are described in detail hereinafter.

Figure 1:
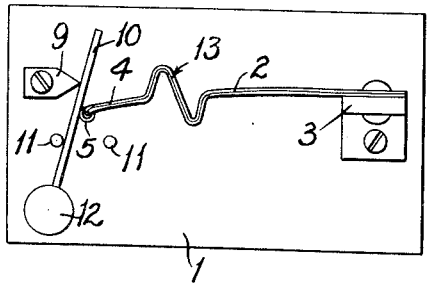
Figures 7, 8:
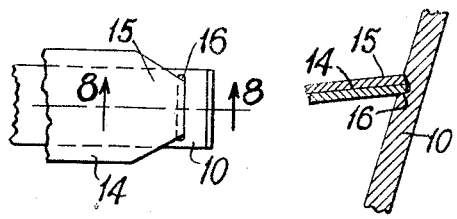
Fig. 7 is an enlarged detail view of a fragment of the control of Fig. 5.
Fig. 8 is a cross-section taken on line 8—8 of Fig. 7.

Referring now more particularly to Fig. 1, numeral 1 indicates a base, which, should the device be employed as an electric switch, preferably comprises "bakelite" or a like insulating material. Numeral 2 indicates a strip of composite thermostatic metal, which is supported at one end on a bracket 3 mounted on base 1. The terms "composite thermostatic metal" as used herein define a metal made up of two or more layers of metals having different temperature coefficients of expansion, such layers being discrete (for example, ordinary "bimetal" as shown in Fig. 8) or of graduated composition (for example, the metal shown and claimed in Vannevar Bush Patent No. 1,870,235). A characteristic of such composite thermostatic metal is its tendency to curl, concave in the sense of the component layer of the lower coefficient of expansion, upon increase of the ambient temperature, or to uncurl, in the same sense, upon decrease of the ambient temperature. The extent or degree of curling is proportionate to the extent of temperature change.

Figure 3:
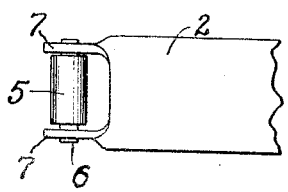
Fig. 3 is an enlarged detail view of a fragment of the control of Fig. 1.
Figure 4:
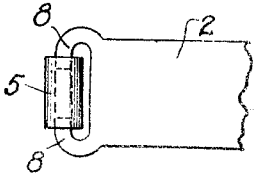
Fig. 4 is a view similar to Fig. 3, but showing an alternative construction.

The thermostatic strip 2 is so mounted on the bracket 3 that its component layer having the higher temperature coefficient of expansion is against the face of said bracket 3. The free end 4 of the thermostatic strip 2 is desirably provided with a roller 5 (see Fig. 3) supported on a pin 6 in turn supported by extensions 7 from the said free end 4 of strip 2. Alternatively, the roller 5 may be supported directly upon in-turned extensions 8 from the said end 4 of strip 2 (see Fig. 4). For the quickest snap action, it is desirable that the diameter of the roller 5 be kept as small as possible.

Positioned in proximity to the free end 4 of strip 2, and immovably mounted on the base 1, is a fulcrum or pivot piece 9, the fulcrum or knife edge of which is perpendicular with respect to the base 1. Supported between the fulcrum 9 and the roller 5 on free end 4 is a bar or control element or lever 10. The lever 10 has desirably formed therein a notch or groove to receive the knife edge of the fulcrum 9, thereby to prevent said lever from sliding longitudinally on said fulcrum, in the general manner shown in Fig. 8. The notch as shown in Fig. 8 is intended to illustrate the notches for all embodiments of the invention, as in the other figures, the scale is too small to admit of the showing of the notch therein.

As will be seen hereinafter, the lever 10 rotates in operation upon the fulcrum 9. Movement or rotation limiting pins 11 are mounted in suitable positions upon base 1 to stop the lever 10. A signal flag 12 is desirably mounted upon the lower end of lever 10, which signal flag 12 is preferably suitably located in respect to the final casing of the device (not shown) as to appear and disappear from a window to indicate predetermined thermal conditions.

The thermostatic strip 2 is preferably provided with one or two lateral corrugations 13 to provide longitudinal, or lengthwise elasticity for the strip 2. With some composite thermostatic metals, however, the corrugations may be dispensed with, and the natural resiliency of the metal relied upon. At any rate, the longitudinal resiliency or elasticity of the strip 2 provides a reaction on the lever 10 holding it firmly against the fulcrum 9 and the left-hand stop 11.

Figure 2:
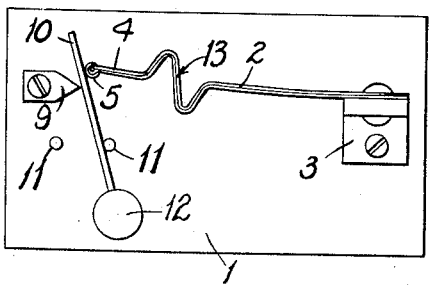
Fig. 2 is a plan view showing the thermostatic control of Fig. 1 in an alternative position.

The operation of the device thus formed is as follows:

If no obstruction were offered, the strip 2, as the ambient temperature increased, would exhibit a tendency to curl upwardly, thus raising (Fig. 1) its free end 4. But there is a reaction on the free end 4 brought about by the reverse slope of the lever 10. In order for the strip 2 to move into a position to satisfy its tendency to curl upwardly, its free end 4 must pass to the other side of the fulcrum 9. However, to do so it must decrease its length, as the distance between the bracket 3 and the normal, cool point of contact of the free end 4 with the lever 10, is greater than the distance between the free end 4 and the fulcrum 9. Decrease of length can only be brought about through compression of the corrugations 13, or, in the case that no corrugations are used, by a noticeable bowing of the strip. The inherent resilience of the metal of which the strip is formed sets up forces which resist such length-wise compression or bowing, and it is only when the thermal forces built up in the strip due to temperature changes equal the resisting forces that the strip is permitted to change its position. However, when the thermal forces do thus achieve equality with the resisting forces, the free end 4 of the strip passes very quickly, with a "snap" action, to the other side of the fulcrum 9, and in so doing rotates the lever 10 on the fulcrum 9 until said lever is stopped by the right-hand pin 11. It will be seen that, the instant after the free end 4 passes over the fulcrum 9, the former resisting forces relieve themselves by aiding the rotation of the lever 10, instead of opposing it, and thus contribute to the "snap" effect. The position of the lever 10 and the strip 2 after the snap is illustrated in Fig. 2. In the Fig. 2 position, the inherent resilience of the strip 2 holds the lever 10 in position against the fulcrum 9 and the right-hand pin 11 in a stable manner, until the cooling phase of the operation commences.

During the cooling phase of the operation the strip exhibits a tendency to return to its Fig. 1 position, by curling downwardly. This tendency is again counteracted by the resilience of the strip as heretofore described, and it is only when the cooling is sufficient to engender the critical thermal force in the strip that it is permitted to snap downwardly to its Fig. 1 position. The details of operation in the cooling phase are the same as those given for the heating phase, with the exception that the forces now work in an opposite direction.

Figure 5:
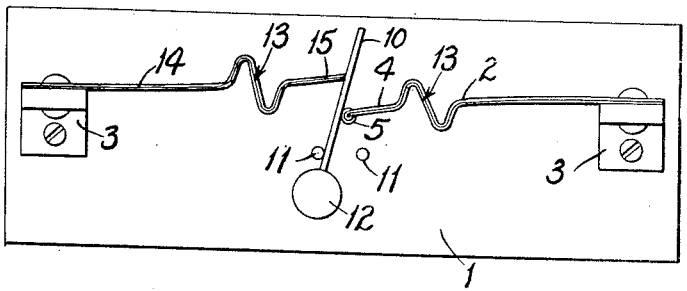
Fig. 5 is a plan view showing a second form of thermostatic control embodying the present invention.
Figure 6:
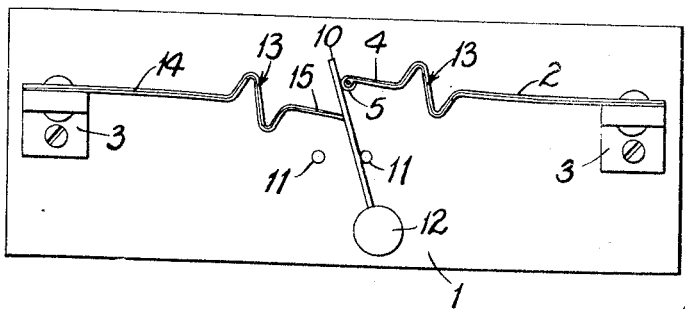
Fig. 6 is a plan view showing the thermostatic control of Fig. 5 in an alternative position.

In Figs. 5 and 6 is shown an improved embodiment of the invention, which, in addition to the thermostatic strip 2, is provided with a second thermostatic strip 14, mounted in a similar manner to the strip 2, but facing in the opposite direction. Further, where the strip 2 has its higher temperature coefficient of expansion metal against the bracket 3, the strip 14 has its lower temperature coefficient of expansion metal against its bracket 3. The two strips 2 and 14 therefore tend to curl in opposite directions upon change of temperature in either sense. In place of the fulcrum 9, the free end 15 of the strip 14 now constitutes the fulcrum for the lever 10. As shown in more detail in Figs. 7 and 8, the lever 10 is provided with a notch 16, into which the tapered end 15 of the strip 14 fits. In other respects, the embodiment of Figs. 5 and 6 is similar to the embodiment of Figs. 1 and 2.

The operation of the Figs. 5 and 6 embodiment is quite similar to that of the embodiment of Figs. 1 and 2, but in the former case the snap action is enhanced by the fact that there are now two thermostatic strips responsive to temperature changes, and they are so mounted that their displacements are opposite to each other, so that, in effect, the fulcrum of the lever is itself subject to thermal influence and this, added to the thermal influence of the strip 2, aids in establishing a system which resists motion to an accurately determinable degree, and thereupon moves with a very sharp snap.

Figure 9:
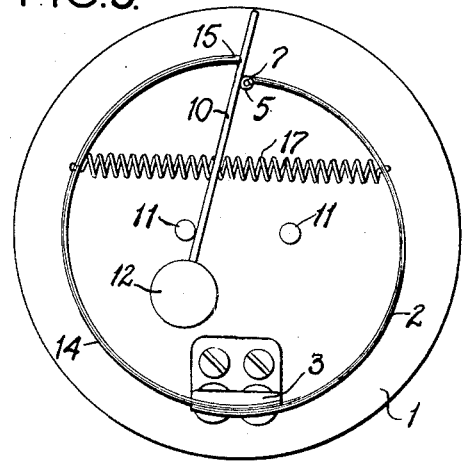
Fig. 9 is a plan view showing a third form of thermostatic control embodying the present invention.
Figure 10:
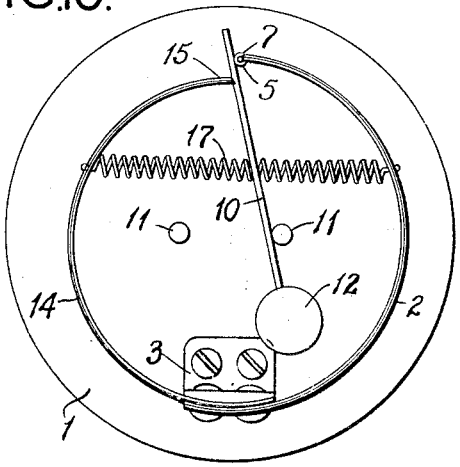
Fig. 10 is a plan view showing the thermostatic control of Fig. 9 in an alternative position.

The embodiment shown in Figs. 9 and 10 is not fundamentally different from that shown in Figs. 5 and 6, but it is, practically speaking, quite a considerable improvement. In Figs. 9 and 10, the thermostatic strips 2 and 14 are curved to substantially semi-circular shape, and are mounted together upon one bracket 3. It will be seen that, theoretically, the embodiment of Fig. 5 is the same as that of Fig. 9, differing only in that in Fig. 5 the semi-circles are of infinite diameter. By making the diameter finite, the strips can be mounted in a much smaller space, and, in addition, they are now, due to their shape, sufficiently resilient sidewardly (that is, in a direction represented by opening their free ends) so that no corrugations are required. To further aid in securing the desired snap action, the inherent resilience of the strips 2 and 14 is, in this embodiment, reenforced by a tension spring 17 which is hooked at its ends on to the strips 2 and 14 to occupy a chordal position. The operation of this embodiment is the same as that of the embodiment of Figs. 5 and 6, with the exception that the thermal forces are now required to build up to a point where they can overcome the combined inherent resilience of the strips 2 and 14 and the spring 17 as well.

Thus far, the invention has been described in its application to a signalling arrangement. In Fig. 11, and the subsequent figures, the application of the invention to an electric switch is shown.

Figure 12:
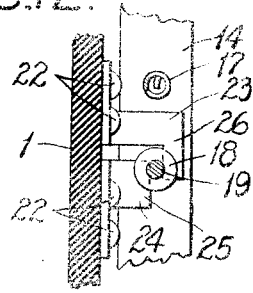
Fig. 12 is a cross-section taken on line 12—12 of Fig. 11.

Referring now more particularly to Fig. 11, it will be seen that the flag 12 has been replaced by a contact means comprising a contacting head 18, a stem 19, a light compression spring 20, and a head 21. The stem 19 passes through a suitable hole in the lever 10. Mounted on the base 1 by means of screws 22 are terminal pieces 23 and 24, which have upright extensions 25 and 26, respectively, (see also Fig. 12). The extensions 25 and 26 are so placed, with relation to each other, that they are bridged over or electrically connected by the contacting head 18. Connecting screws 22 are provided on each piece 23 and 24, for attaching wires of the electrical circuit to be controlled.

The operation of this embodiment of the invention is, so far as the thermostatic portion thereof is concerned, identical to the operation of the embodiment of Fig. 9. When the lever 10 is in its left-hand, Fig. 11 position, the terminal pieces 23 and 24 are connected together by the contacting head 18. When the lever 10 shifts to its right-hand position (as in Fig. 10), the head 18 of course moves with it, and the connection between the terminal pieces 23 and 24 is broken, with a snap action. The compression spring 20 aids in separating the head 18 from the terminals 23 and 24 with the desired snap action (in the nature of light hammer blow), as it permits the lever 10 to commence its movement, to a slight extent, before separation.

Figure 13:
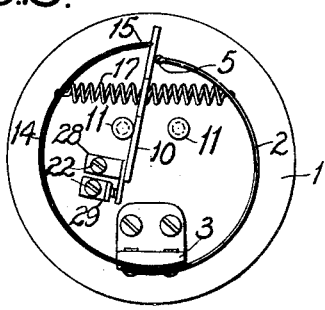

The Fig. 13 embodiment of the invention is in many respects similar to the Fig. 11 embodiment, but instead of the circuit completing member being carried on the lever 10, it is mounted permanently on the base 1, and takes the form of a spring terminal member 28, normally arranged to be separated from the other terminal member 29, but positioned so that when it is engaged by the lever 10 it moves into electrical connection with said other terminal member 29. The arrangement is somewhat similar to that of the leaves of a telephone jack. The terminal member 29 may likewise be made of spring material.

Figure 14:
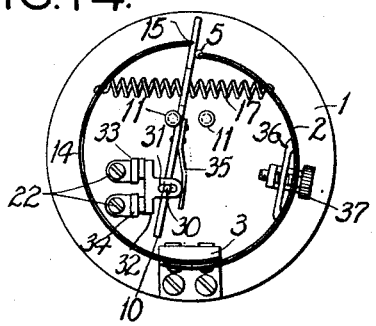

The Fig. 14 embodiment is similar to the Fig. 11 embodiment in that the lever 10 carries the circuit completing member. A pin 30 extends from the lever 10, in the same plane as said bar, and carries thereon (through slots 31) a contact-bridging piece 32. The piece 32 is of a suitable size and shape to connect the two terminal pieces, indicated at numerals 33 and 34. The piece 32 is tensioned by a leaf spring 35 reacting at its other end upon the face of lever 10.

The Fig. 14 embodiment is novel over the foregoing embodiments in one additional respect, namely, that means are provided, for the first time, for adjusting the temperature at which the control will operate. In this connection it will be remembered that the device "snaps" when the accumulated thermal forces are sufficient to overcome the combined resilient reaction forces of the two bimetallic strips 2 and 14 plus the force of spring 17. Another method of expressing this is that the snap occurs when the thermal forces are enough to displace the bimetallic strips to a point that their free ends exactly meet. Now, if means are provided such that the extent of displacement for one of the strips, or both, may be varied so that a greater travel of its free end is necessary before it exactly meets the other free end, it will be seen that the device will not snap until a higher temperature has been reached. The converse is also true.

With this in mind, a tensioning bar 36 is provided on the strip 2, having an adjustable screw 37 by which the strip 2 may be curved outwardly or uncurled to a greater extent, consequently lowering the snapping temperature.

It will be understood that this type of adjusting means may likewise be used with any of the foregoing (or subsequent) embodiments of the invention.

Figure 15:
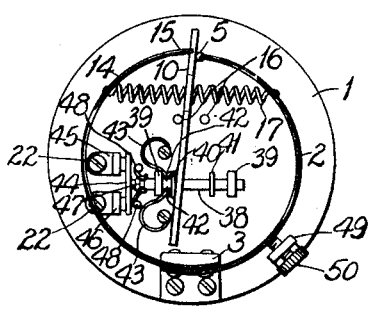

A still further embodiment of the invention is shown in Fig. 15. Here a rod or slider 38 is provided, which passes through a suitable slot or hole in the bar 10. The slider 38 is carried in bearings 39 mounted on the base 1. Collars 40 and 41 are positioned on the slider 38, one on each side of the lever 10. In the collar 40 are provided sidewardly disposed notches 42. Springs 43, mounted at one end on the base 1, have their other ends positioned to engage the notches 42 under certain conditions, as indicated hereinafter. The left-hand end of the slider 38 carries a contact bridging bar 44, which is shaped to electrically connect terminal pieces 45 and 46. Further notches 47 are provided in the slider 38 just behind the bar 44, and cooperating springs 48 are suitably mounted upon the base 1.

The operation of this embodiment is as follows: When the lever 10 moves to the left, it hits the collar 40 and thrusts the slider 38 likewise to the left, such that the springs 43 fall into the notches 42. In this position, the contact bridging bar 44 completes the circuit between the terminals 45 and 46. When, now, the lever 10 swings to the right, it hits the collar 41 and forces the slider 38 to the right. Springs 43 then disengage from notches 42, but at the same time springs 48 fall into notches 47, to hold the contact bridging bar 44 in disconnecting position.

The Fig. 15 embodiment is further provided with an alternative means for adjusting the operating temperature of the device. The present means comprises a bracket 49, mounted on base 1 outside the strip 2, and having an adjustable screw 50 bearing upon the outer surface of strip 2. By manipulating the screw 50, the strip 2 is curled inwardly to a greater extent, and hence, in accordance with the explanation given hereinbefore, the operating temperature of the device increases or is raised. This adjusting means may likewise be used with any of the embodiments herein described, separately or in conjunction with the adjusting means 36 of the Fig. 14 embodiment.

Figure 16:
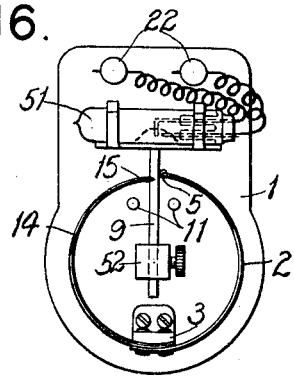

In Fig. 16 is shown a further embodiment wherein a mercoid switch 51 is mounted on the outer end of the lever 10. A counterbalancing weight 52 is desirably mounted on the inside end of lever 10. The swinging of the lever 10 with temperature change operates the mercoid switch to make and break contacts.

Figure 17:
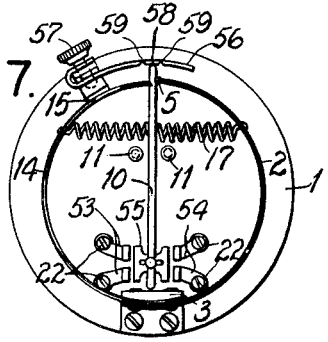

Fig. 17 illustrates a still further embodiment of the invention in which two pairs of terminals 53 and 54 are provided on either side of the lower end of the lever 10, one pair to be connected (by a contact bridging bar 55) in each position of the lever 10. Positioned at the extreme upper end of the lever 10 is a spring 56, which bears upon the end of the lever 10 with varying force, as determined by a screw 57. The lever 10 may be pointed at the end, as at numeral 58, and engage a succession of notches 59 in the under side of spring 56. The spring 56 functions to implant an additional, variable tension on the lever 10, which additional tension must be overcome before the device can "snap", and hence provides an additional means for adjusting the snapping temperature of the device.

Figure 18:
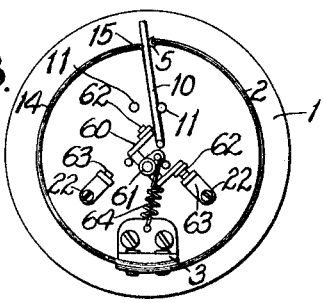

Fig. 18 illustrates the application of the present invention to a switch of the over-centering type, comprising an E-shaped member 60 pivoted as at numeral 61, and carrying contacts 62 adapted to engage terminals 63. A spring 64 provides the over-centering impulse. In operation, the lower end of the lever 10 bears against the extensions of the E-member 60, until said member is over-centered to make a new connection.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A thermostatic control comprising a fulcrum, a control element rotatable about said fulcrum, said element being adapted to be moved quickly from one controlling position to another, means for applying a resilient rotative force to said element, said means including thermostatic means for shifting the point of application of said force on said control element from one side of said fulcrum to the other, whereby said element is shifted from one controlling position to the other in response to temperature changes of a predetermined magnitude.

2. A thermostatic control as set forth in claim 1 in which the thermostatic means comprises a strip of composite thermostatic metal.

3. A thermostatic control comprising a fulcrum, a lever pivoted on said fulcrum, means limiting the rotation of said lever in both directions about said fulcrum, a composite thermostatic metal strip fixed at one end relative to said lever and having its other end resiliently engaging the face of said lever, said strip being positioned so that, in response to temperature changes, its said other end slides on the surfaces of said lever from one side to the other side of said fulcrum, whereby said lever is rotated into different controlling positions.

4. A thermostatic control as set forth in claim 3, in which the fulcrum comprises the free end of a second composite thermostatic metal strip, said second thermostatic strip being so mounted that it changes position in an opposite direction in response to temperature changes from the direction of change of position of the first-mentioned thermostatic strip.

5. A thermostatic control comprising a pair of composite thermostatic strips so disposed as to move oppositely in response to temperature variations, and a control element operatively connected to the ends of both of said strips, the connection to one strip being non-slidable longitudinally on the element, while the connection to the other strip is slidable longitudinally on the element, said strips being thereby adapted, in response to predetermined temperature variations, to change their relative positioning with respect to said element in a substantially instantaneous manner.

6. A control as set forth in claim 5, in which the control means comprises an electric switch.

7. A control as set forth in claim 5, in which the control means comprises a signal.

8. A thermostatic control comprising a pair of substantially semi-circular resilient composite thermostatic strips, said strips being secured together at one end to form a substantially complete circle, said strips having their free ends slightly displaced one from the other and, to a relatively slight extent, overlapping, said strips being so disposed that in response to temperature variations, one tends to increase its radius of curvature, while the other tends to decrease its radius of curvature, and means operatively connected to each of said free ends and adapted to be moved by the relative change of position of said free ends in response to said temperature variations, said last named means comprising a lever disposed substantially radially with respect to the circle, said lever being abutted on one side by one free end, and on the other side by the other free end.

9. A thermostatic control comprising a pair of substantially semi-circular resilient composite thermostatic strips, said strips being secured together at one end to form a substantially complete circle, said strips having their free ends slightly displaced one from the other and, to a relatively slight extent, overlapping, said strips being so disposed that in response to temperature variations, one tends to increase its radius of curvature, while the other tends to decrease its radius of curvature, and means operatively connected to each of said free ends and adapted to be moved by the relative change of position of said free ends in response to said temperature variations, said last named means comprising a lever disposed substantially radially with respect to the circle, said lever being abutted in a non-sliding manner on one side by one free end, and in a sliding manner on the other side by the other free end.

10. A thermostatic control comprising a pair of substantially semi-circular resilient composite thermostatic strips, said strips being secured together at one end to form a substantially complete circle, said strips having their free ends slightly displaced one from the other and, to a relatively slight extent, overlapping, said strips being so disposed that in response to temperature variations, one tends to increase its radius of curvature, while the other tends to decrease its radius of curvature, and means operatively connected to each of said free ends and adapted to be moved by the relative change of position of said free ends in response to said temperature variations, and means for varying the radius of curvature of one of said strips independently of temperature variations.

11. A thermostatic control comprising a pair of substantially semi-circular resilient composite thermostatic strips, said strips being secured together at one end to form a substantially complete circle, said strips having their free ends slightly displaced one from the other and, to a relatively slight extent, overlapping, said strips being so disposed that in response to temperature variations, one tends to increase its radius of curvature, while the other tends to decrease its radius of curvature, and means operatively connected to each of said free ends and adapted to be moved by the relative change of positions of said free ends in response to said temperature variations, and a tension spring occupying a chordal position with respect to said circle, and attached to both of said strips, whereby to provide a force tending to draw said free ends toward each other.

12. A thermostatic control as set forth in claim 8 in which the said lever is associated with and operates an electric switch.

13. A thermostatic control as set forth in claim 5, including means for varying said predetermined temperature.

PERCY LE BARON SPENCER.